July 21, 1931.  A. F. LAKE  1,815,853
ALTERNATING CURRENT BELL
Filed Sept. 28, 1925
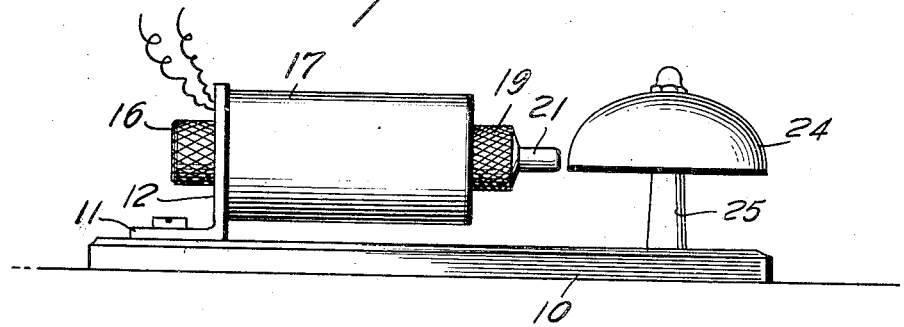
Fig. 1.
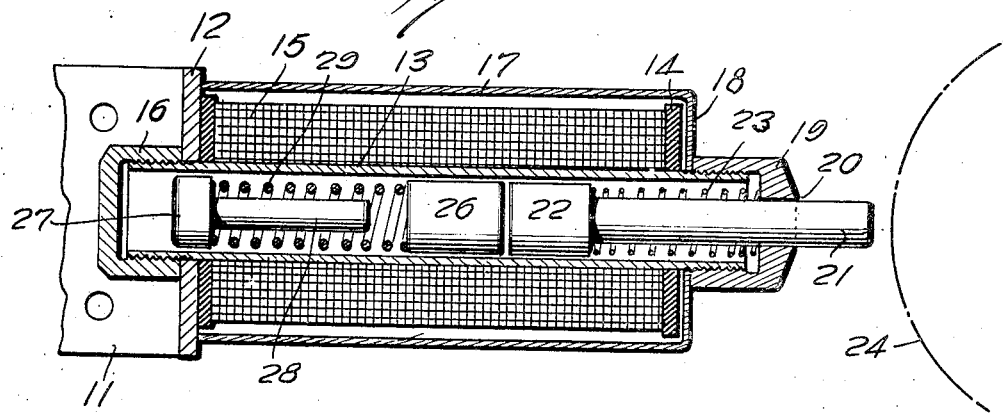
Fig. 2.
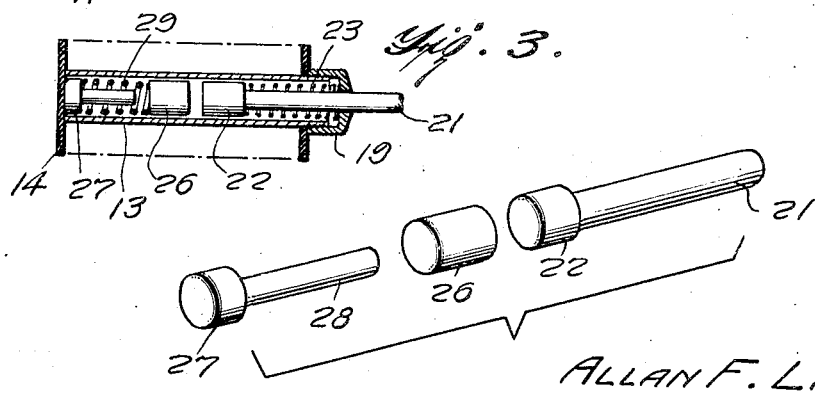
Fig. 3.
Fig. 4.
Inventor
ALLAN F. LAKE,
By Townshend & Townshend
Attorneys Patented July 21, 1931

1,815,853

UNITED STATES PATENT OFFICE

ALLAN F. LAKE, OF OAKLAND, CALIFORNIA, ASSIGNOR TO LAKE MANUFACTURING CO., INC., A CORPORATION

ALTERNATING CURRENT BELL

Application filed September 28, 1925. Serial No. 59,115.

My invention relates to audible signalling apparatus operated by an alternating electric current. The primary object of the invention is the provision of an alternating current bell mechanism having means for oscillating a bell striker at a frequency considerably lower than that of the alternating current.

Another object of the invention is the provision of a novel alternating current bell mechanism, the striker whereof consists of a solenoid having a plural element core.

A further object of the invention is the provision in an alternating current solenoid for audible signalling apparatus, of a mutually attracting separated element core having para-magnetic retarding means between the elements thereof.

A still further object of the invention is the provision in an alternating current solenoid bell striker of means for damping the oscillating frequency of a solenoid core.

With these and such other objects in view as will be apparent from the description, my invention resides in the novel construction, combination and arrangement of parts hereinafter described and claimed and illustrated in the accompanying drawings of which:—

Figure 1 is a side elevation of a bell mechanism constructed in accordance with the principles of the invention;

Figure 2 is a fragmentary horizontal section therethrough;

Figure 3 is a fragmentary vertical section through a modified form of mechanism;

Figure 4 is a group perspective of the solenoid core elements.

In detail the invention comprises a base 10 having secured adjacent one end thereof the short arm 11 of an L-shaped bracket the long arm 12 of which extends upwardly from the base and is apertured to receive therethrough the external threaded end of a brass tube 13. Spaced inwardly from the opposite ends of the tube 13 and threaded thereover are insulation disks 14 between which, over the tube 13 is wound the coil 15 of the solenoid. A cap nut 16 disposed over one end of the tube 13 is adapted to clamp the upright arm 12 of the L-shaped supporting bracket against an end disk 14 of the solenoid thereby securing the solenoid in service position.

The winding 15 of the solenoid may be enclosed within a cylindrical casing 17 having one end open and closed by the upright arm 12 of the supporting bracket against which the casing is forced. The opposite end 18 of the casing is closed and provided with a central aperture whereby the casing is applied over the tube 13, being retained in position by means of a cap nut 19 threaded over the opposite end of the tube 13 which projects beyond and through the end 18 of the casing. It will be apparent that upon tightening the cap nut 19 the casing is moved longitudinally over the solenoid to force its open end into engagement against the arm 12 of the supporting bracket to provide a complete enclosure for the solenoid.

The cap nut 19 is formed with a central circular bore 20 extending therethrough, through which bore is guided a bronze striker arm 21 having at its inner end an enlarged head 22 slidable within the tube 13 and normally retracted within the solenoid by expansion of a coil spring 23 surrounding the striker arm 21 between the head 22 and cap nut 19. On being projected from the coil of the solenoid the striker arm 21 is adapted to contact against a bell 24 or other suitable sounding mechanism, carried by a supporting post 25 mounted on the end of the base 10 opposite the supporting bracket.

The core of the solenoid consists of a plurality of elements normally held in spaced relation within the tube 13. These elements comprise a cylinder 26 of soft iron disposed within the tube 13 adjacent the head 22 of the striker arm for free longitudinal movement within the tube, and a cylindrical soft iron pole piece 27 having a reduced shank 28 extending therefrom in the direction of the central core element 26. The soft iron core pieces 26 and 27 are maintained in spaced relation by means of a relatively heavy steel coil expansion spring 29 surrounding the shank 28 between the two core pieces. The spring 29 being of steel is para-magnetic and assists in the completion of a magnetic path through the core of the solenoid while at the same time, due to its expansion, resisting the internal movement of the core section 27 whereby the oscillatory movement of the separate elements of the core is dampened. The striker arm 21 and head 22 being of bronze are not affected by the magnetic flux within the solenoid.

Under ordinary conditions an alternating current solenoid provided with a unitary core piece, would be of no effect in the operation of a bell due to the fact that the core of the solenoid would oscillate at the frequency of the current which is normally 60 cycles. This frequency is too great to permit the proper bell vibration and would result merely in the production of a buzzing sound. In the present invention when the winding 15 is energized by one-half cycle of an alternating current, the soft iron core piece 27 together with the steel spring 29 are pulled inwardly toward the center of the solenoid, acting to throw the core piece 26 against the head 22, the force of the blow being sufficient to project the striker arm 21 into contact with the bell 24. As the current drops toward zero the springs 23 and 29 expand rapidly, reacting from the sudden compression, and the expansion carries the head 27 of the plunger to its limit of outward travel. Before the expansion movement of the springs has been completed the other side of the current energizes the coil but the inward movement of plunger 28 is resisted and checked by the expansive action of the springs as stated. Before the check thus imparted can be overcome, the current again drops to zero, and consequently no striking action will have occurred. When the current next rises in value, the expansion action of the springs will have been expended and the core 28 will be drawn inwardly to again perform the striking action as first stated. Thus the frequency of operation of the striker is less than the frequency of the current, and the speed of action of the striker is so reduced that a proper tone may be produced from the bell. This reduced frequency of oscillation of the solenoid core causes the striker arm 21 to move in accordance therewith and engage the bell in such manner that its proper tone may be produced.

In the modified form illustrated in Figure 3, the supporting bracket is dispensed with, together with the cap nut 16 of the preferred form. In this modification the solenoid may be mounted directly upon the base with one end of the tube 13 being closed by one of the fiber disks 14, the opposite end being engaged by the cap nut 19 as in the preferred form which supports therethrough the striker arm 21 having its head 22 adapted to be engaged by the core piece 26 under action of the steel spring 29 disposed around the shank of the core piece 27.

The above described operation of the mechanism is theoretical and no assertion is made that it is a positive and accurate explanation of what takes place. It is certain that with the construction as described herein, the mechanism operates as intended and there is a reduced oscillation frequency of the striker mechanism relative to the current frequency of the solenoid. This reduction in the relative frequencies is entirely novel and produces results hitherto impossible of accomplishment in devices of this class.

While in this illustration of an embodiment of the invention I have described certain details and materials entering into the construction and operation thereof, I desire it to be understood that the invention is not to be limited thereby, but that any desired changes and modifications may be made in the details as will fall within the scope of the invention as claimed.

I claim:—

1. In an alternating current solenoid operated signal mechanism, a solenoid, a core in the solenoid formed of lineally disposed disconnected members adapted to oscillate under magnetic flux, a spring disposed between said disconnected members in lineal relation therewith, a plunger movable in one direction in said core by action of said members, and a spring in said core or moving said plunger in an opposite direction.

2. In an alternating current solenoid operated signal, a solenoid, a sectional core therein, and resilient means movably associated with the core sections and forming a part thereof for reducing the oscillation frequency of the solenoid core to less than the current frequency.

3. In an alternating current solenoid operated signal mechanism, a solenoid, and a core therein consisting of two movable members of like magnetic characteristics, an expansion spring between said members, a non-magnetic plunger adjacent one of said members, and an expansion spring between a portion of said plunger and one end of the solenoid, said springs cooperating with said members and plunger to retard the oscillating frequency of the plunger to less than the current frequency.

In testimony whereof I have affixed my signature.

ALLAN F. LAKE.